Feb. 12, 1935.   S. B. THOMAS   1,990,845
SPONGE IRON KILN
Filed May 8, 1933   3 Sheets-Sheet 1
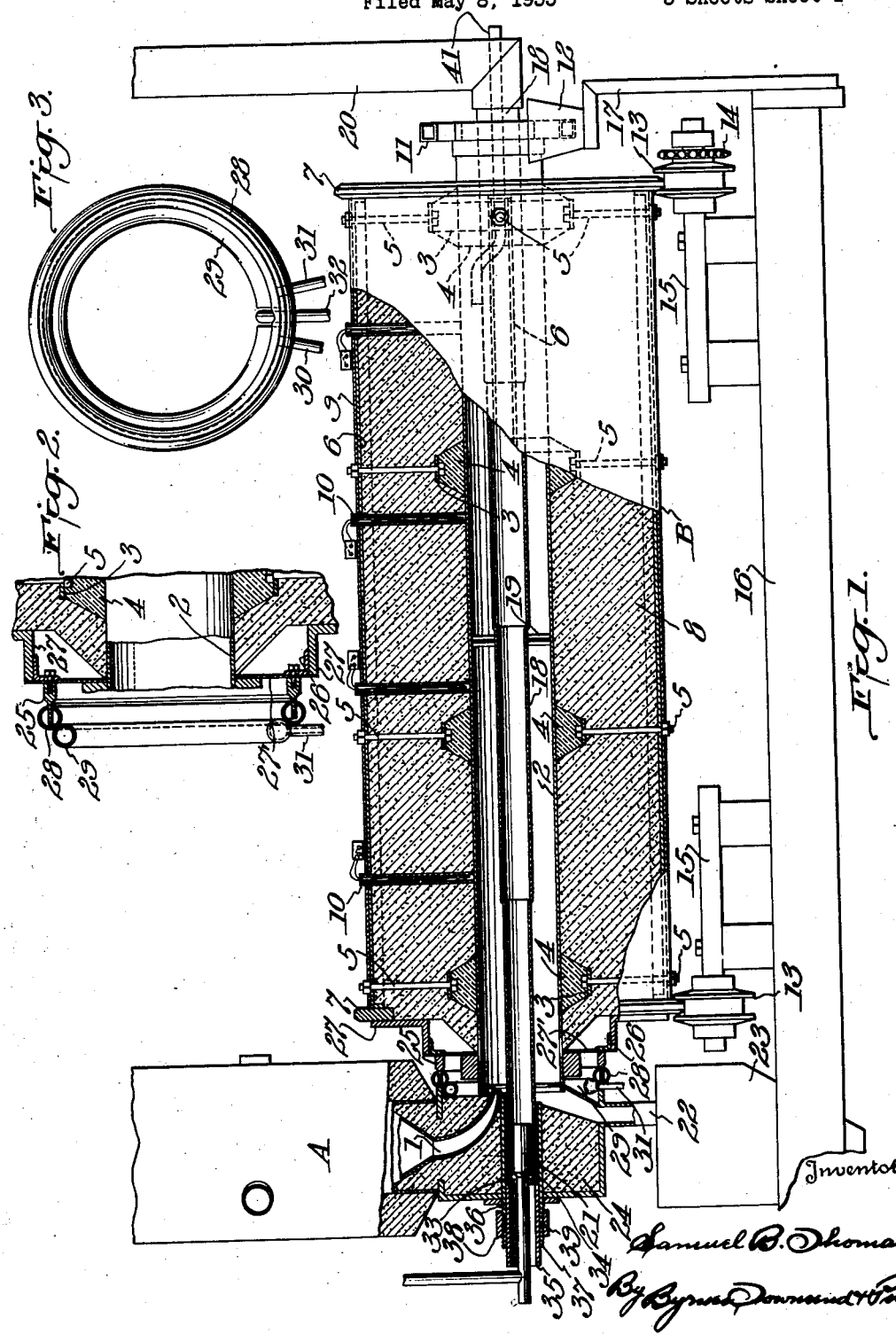

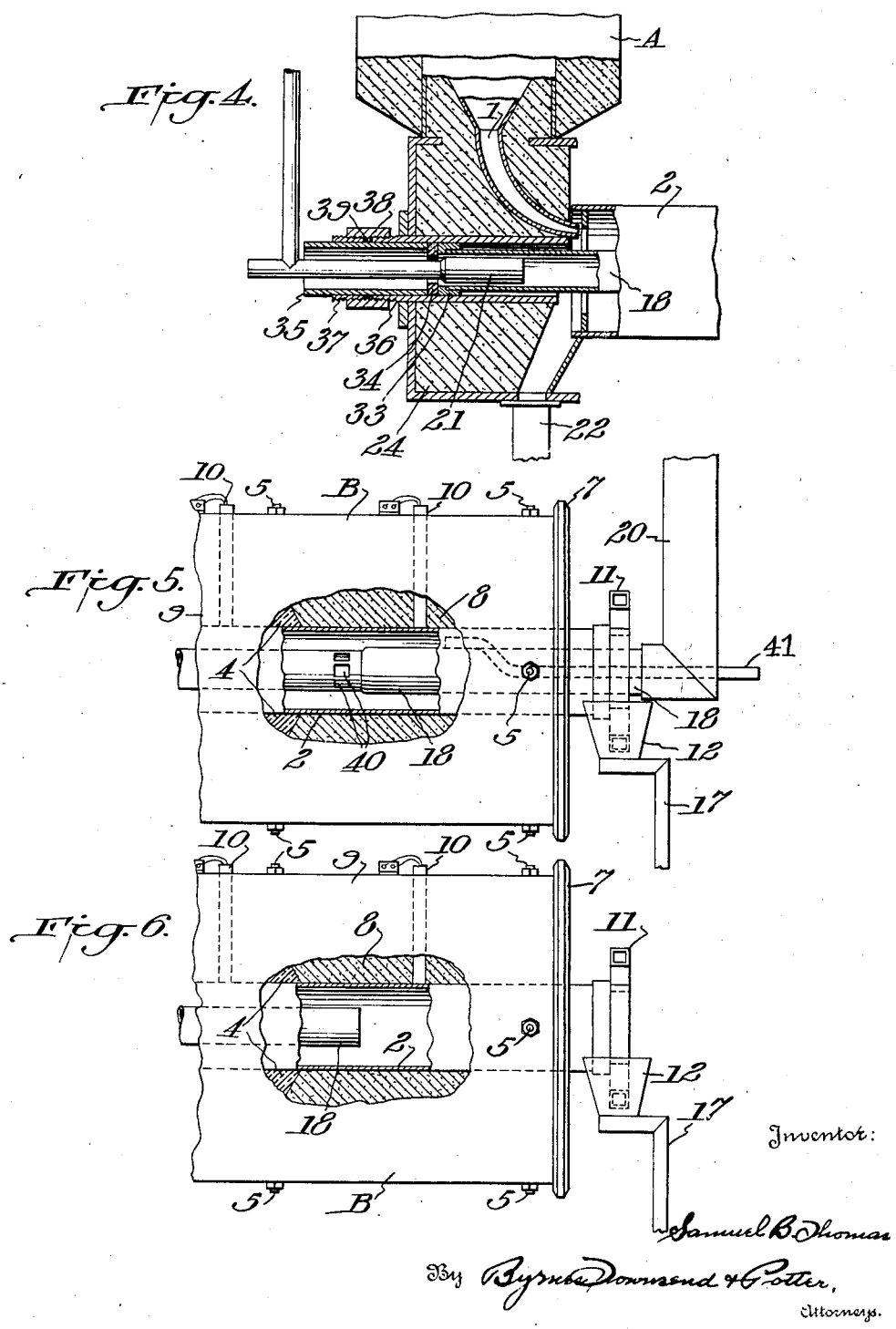

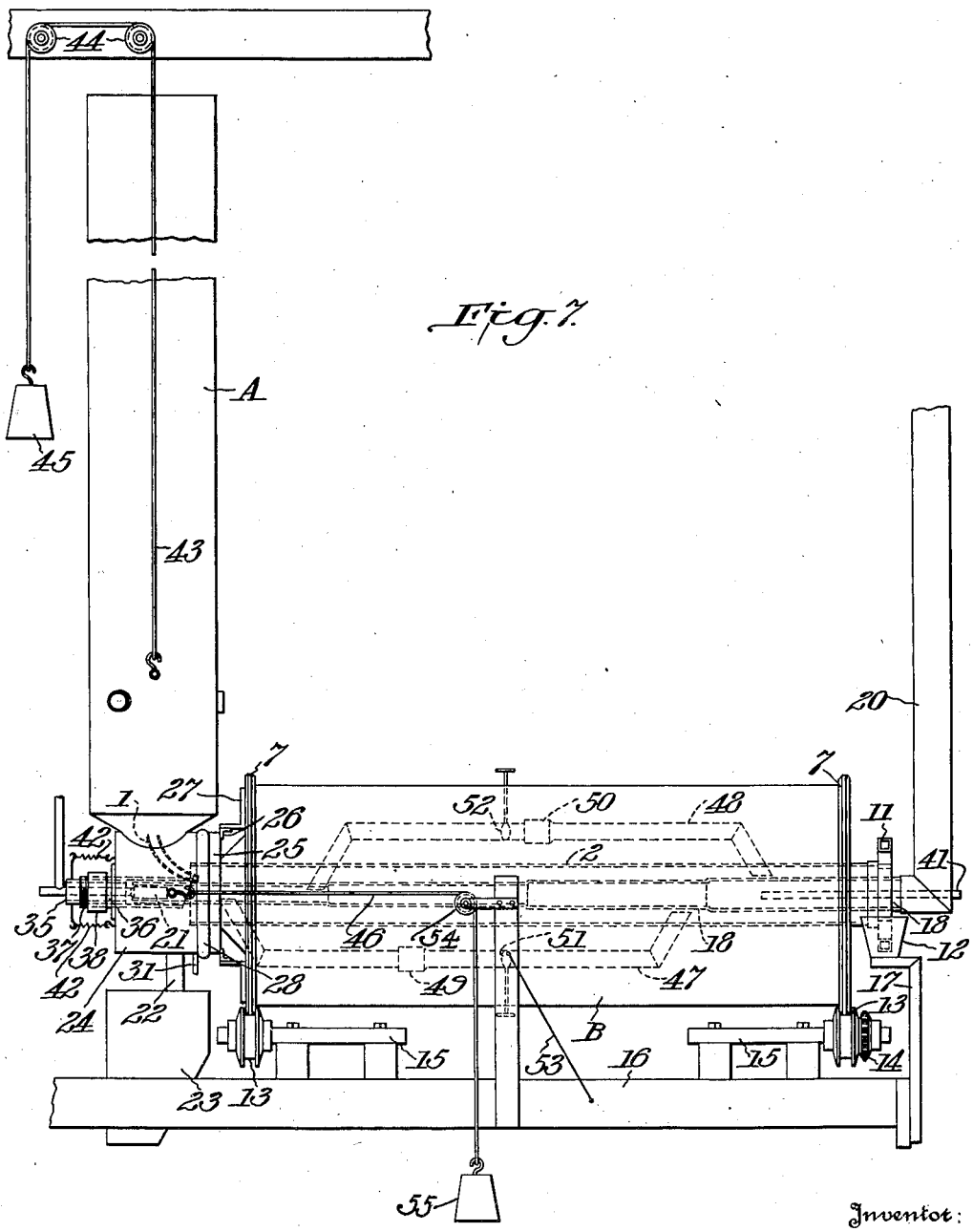

Patented Feb. 12, 1935

1,990,845

UNITED STATES PATENT OFFICE 1,990,845

SPONGE IRON KILN

Samuel Benson Thomas, Berkeley, Calif., assignor to Thomas B. Swift, Contra Costa County, Calif.

Application May 8, 1933, Serial No. 670,020

9 Claims. (Cl. 263—33)

This invention relates to a kiln designed primarily for the production of sponge iron directly from iron ore by means of a reducing gas and without the use of a solid reducing agent.

In an application in the name of Charles G. Maier, Serial No. 609,966, filed May 7, 1932, there is described a process of reducing ores by means of hot reducing gases, derived from hydrocarbons, such as natural gas, by controlled oxidation with air, in the presence of a catalyst or contact mass, said reducing gas consisting essentially of carbon monoxide and hydrogen, together with nitrogen derived from the air used, but practically free of hydrocarbons and the higher oxidation products, carbon dioxide and water. The present invention is designed to provide a furnace or kiln for carrying out this reduction process in a continuous and practicable manner.

The successful utilization of gaseous reducing agents for the reduction of iron oxides and ores of similar reducibility, including iron ore and pyrite sinter, in the absence of solid carbonaceous material, involves a number of essential requirements which are not fulfilled by apparatus heretofore known in the art. Not only must the ore be contacted and maintained in contact with the reducing gas at the sufficiently elevated temperatures to ensure rapid reduction rates, but air and combustion gases must be excluded. It is obvious that at each position or condition of the passage of ore through a continuous reducing apparatus, the ore or product must not contact any gaseous or solid oxidizing agents which might cause a reoxidation or reversal of the process. Assuming that the reducing gas may be delivered at a sufficiently high temperature, external heating may not be required for certain conditions of gas and ore, but in technical operation supplemental heating is desirable. This supplemental heating must not involve combustion of the reducing gas in the presence of the ore being reduced, because this would introduce combustion products and interfere with the ore reduction and must therefore be accomplished by indirect heating, e. g. by conduction of heat through a gas-tight partition.

Another requirement for the gas method of reduction is the provision of means for removing and cooling the product in the absence of air or gases capable of oxidizing it. This also has not heretofore been accomplished in the art with complete satisfaction.

It will be understood that reference is made herein to the use of a preheated reducing gas consisting essentially of carbon monoxide and hydrogen and to the reduction of iron ore to sponge iron merely for convenience in describing the apparatus. The invention of this application resides in the kiln and is not limited to any particular process or to the use of any particular reducing gas. In fact, the kiln is adapted to carry out other reduction processes and desulphurizing processes by the use of other reducing gases, such as hydrogen, carbon monoxide and hydrocarbons other than methane, which is quite stable and not a satisfactory reducing gas, which reducing gas need not be preheated.

The kiln of my invention is shown in connection with a gas producer of the type described in said Maier application Serial No. 609,966, and in another application in the name of Charles G. Maier, Serial No. 609,965, filed May 7, 1932, which gas producer converts a mixture of a hydrocarbon, such as natural gas, and air by controlled oxidation with the use of a catalyst or contact mass and without flame, into a mixture of carbon monoxide, hydrogen and nitrogen, substantialy free of carbon dioxide, water and hydrocarbons, and delivers the mixture at a high temperature, e. g. 1000° C. or higher, into the kiln.

The kiln is illustrated in the accompanying drawings in which:

Fig. 1 is a side elevation of the kiln with parts broken away showing the internal construction in axial section;

Fig. 2 is an enlarged fragmentary sectional elevation of the head end of the kiln showing particularly the gas seal between the kiln and the stationary head;

Fig. 3 is an enlarged interior view of portions of the seal;

Fig. 4 is an enlarged fragmentary sectional detail view of the gas seal between the heating tube and the stationary head;

Fig. 5 is a fragmentary axial sectional view of the feed end of the kiln, showing a modified construction;

Fig. 6 is a view similar to Fig. 5, but showing a further modification; and

Fig. 7 is another side elevation of the kiln in which certain details shown in Fig. 1 are omitted and other details are shown.

Referring to the drawings, A marks the gas producer which is shown only diagrammatically and without details, since the specific gas producer construction forms no part of the present invention, and B marks the kiln proper. The gas producer A may be regarded simply as a source of reducing gas which is delivered into the kiln through the heat insulated stationary pipe 1.

The kiln comprises the tube 2 made of a suitable refractory material such as alloy steel of about 10-gauge sheet metal. This tube is supported (see Fig. 1) by four steel rings 3 lined with refractory material 4 and suspended by bolts 5 to the longitudinal channel beams 6 of which there are four, equally spaced around the circumference and supported at their ends by the two kiln rings 7. The tube 2 is heavily insulated by refractory insulating material 8, such as silocel, held in place by the outer sheet iron jacket 9 which is also supported by the channel beams 6. The kiln is provided with four alloy steel thermocouple wells 10, a conventional scoop feeder 11 which delivers ore into the tube 2 from the hopper 12, and a gas sampling tube 41. The kiln rings 7 rest on the flanged rollers 13 at least one of which is driven by the cog wheel 14 connected to a source of power (not shown) by a chain (not shown). The rollers 13 are carried on the framework 15 which rests on the floor or base 16. The hopper 12 is supported by the frame 17 upon the base 16. The feeder 11 revolves with the feed end of the tube 2.

Within the tube 2 is the heating tube 18 supported therein by the radial spokes 19. Tube 18 is concentric with the tube 2, but increases in cross-sectional area in the direction of the feed end of the kiln. It passes through the feeder 11 making a gas-tight joint therewith and communicates with the stack 20. Tube 18 is heated by hot gases from the burner 21. The kiln discharges through the pipe 22 into the gas-tight cooler 23.

In order to prevent the entry of air into the kiln, that is, into the space in which reduction of the ore takes place, between the tubes 2 and 18, it is necessary to seal the joints between the stationary head 24 which carries both the reducing gas conduit 1 and the ore discharge conduit 22, both of which communicate with this space, and the rotating tubes 2 and 18 against leakage.

For sealing the tube 2 to the stationary head I have provided on the end of the kiln structure outside of the end of the tube 2 a ring 25, secured to the kiln ring 7 through the adjustable brackets 26 and 27. These brackets also carry the web 27' which extends between the ring 25 and the tube 2. Web 27' is made of light sheet metal and consequently does not conduct much heat and moreover lends a certain flexibility to the construction which is quite important. The space between the web 27' and the end of the insulating mass 8 is open to the air for cooling so that the seal is protected against the heat of the kiln. The stationary head carries the slotted pipe 28 and the cooling pipe 29. Cooling pipe 29 is provided with pipes 30 and 31 for circulating a cooling fluid therethrough and is in contact, e. g. welded or brazed, to the pipe 28 which is provided with a grease supply pipe 32. The edge of the ring 25 fits into the slot in the pipe 28 and by the presence of grease therein provides a low pressure gas-tight joint. The gas supply pipe 1 communicates with the kiln inside of this gas-tight joint.

The end of the heating tube 18 is sealed to the stationary head 24 in such a way as to prevent entrance of air between the tubes 2 and 18 and also to permit expansion and contraction of the tube 18. The end of tube 18 is provided with the machined fitting 33 which bears against the graphite washer 34 and the latter is backed up by the cast iron sleeve 35. The sleeve 35 is free to slide within the larger pipe 36 which forms a part of the stationary head 24. The sleeve 35 is sealed to the pipe 36 by the packing gland comprising parts 37 and 38 and the asbestos packing 39. The sleeve 35 is held tight against the graphite washer 34 by means of spring 42.

In order to allow for slight eccentricity of the kiln, the stationary head 24 together with the gas producer A are suspended by means of cables 43 that pass over pulleys 44 carrying counterweights 45 so that the head is free to move slightly as the kiln rotates in order to maintain the alignment of the seals without undue stress on the parts. Other cables 46 acting in a horizontal direction serve to hold the head tightly against the kiln: In other words, the kiln head, while stationary in the sense that it does not revolve with the kiln, is flexibly mounted so that it may move slightly to compensate any movement of the kiln as it revolves. Cables 46 pass over pulleys 54 and carry weights 55. 53 is a brace cable.

The operation of the apparatus illustrated in Figs. 1 to 4 is as follows:

Reducing gas is supplied through the pipe 1 to the space between the tubes 2 and 18 and passes through the same, countercurrent to the movement of the ore supplied by the feeder 11. After passing through this space the reducing gas passes out through the feeder 11 and burns in the air. The reduced ore is discharged through the pipe 22 into the closed cooler 23. Heat is supplied by conduction through the wall of the tube 2 from the hot gases supplied thereto by the burner 21. In case the reducing gas is supplied at a high temperature from the producer its temperature is maintained in its passage through the pipe 1 which is surrounded by the insulating material of the kiln head 24. The gas seals described not only prevent entrance of air or combustion gases from the burner 21 into the reduction zone of the kiln between tubes 2 and 18, but also prevent escape of reducing gas into the surrounding atmosphere. The supply of air to the burner 21 serves to cool the seal between the pipe 18 and the stationary head 24, particularly the sleeve 35 and asbestos packing 39.

In the apparatus described above and illustrated in Figs. 1 to 4, care is taken to prevent any mixing of the heating gases supplied to the tube 18 by the burner 21 with the reducing gases in the space between the tubes 2 and 18. It is particularly important to prevent such mixing as well as the entrance of air into the reducing zone at the head end of the kiln. However, as the reducing gases approach the feed end of the kiln, their reducing action becomes practically nil and they serve primarily to heat the incoming ore. In order to facilitate this action and to use the residual heat value of the gases, the tube 18 may be provided with openings 40 at a point about one-fourth to one-third of the length of the kiln from the feed end thereof (see Fig. 5) to permit the mixing of the reducing gas with the oxidizing gas in tube 2 and combustion of the mixture with the generation of additional heat which serves to additionally heat the incoming ore. As will be apparent the gas which may pass through openings 40 into the kiln cannot pass toward the head end thereof against the flow of reducing gas in the opposite direction and therefore cannot interfere with the ore reduction. Or I may, as illustrated in Fig. 6, cut off the end of the pipe 18 at about one-third of its length from the feed end of the kiln and allow the reducing gases in the space between tubes 2 and 18 and the oxidizing gas in the tube 2 to mix and burn and heat the incoming ore. The resulting combustion products pass out through the feeder 11, the stack 20 being dispensed with. Both of these procedures, involving in effect a preheating and preliminary roasting of the incoming ore, have a beneficial effect upon ores containing sulfur and other metalloidal constituents. A further modification of the apparatus is the provision of means for collecting the reducing gas as it leaves the feed end of the ore space between tubes 2 and 18 and returning it to the burner end of the tube 18. This is illustrated in Fig. 7 in which the kiln B is shown turned through an angle of 45° from its position as shown in Fig. 1. As appears in Fig. 7, I have provided conduits 47 and 48 embedded in the insulating material 8 and communicating with the ore space adjacent the feed end of the kiln and with the tube 18 adjacent the discharge end of the kiln. The spent reducing gas delivered thereby to the tube 18 adjacent the burner 21 burns with the air supplied to the burner and thus may supplement or entirely replace the fuel supplied to the burner. The conduits 47 and 48 are provided with expansion joints 49 and 50 and with dampers 51 and 52. As will be apparent any desired number of such conduits may be provided and they may be arranged as illustrated to withdraw reducing gas from the ore space at different distances from the feed end of the kiln and to deliver the reducing gas into the tube 18 at different distances from the burner 21. In this way the entire heating requirements may be supplied without the use of fuel other than that used to produce the reducing gas.

In the operation of the apparatus illustrated I have succeeded in reducing a roasted pyrite ore analyzing 83.2% $Fe_2O_3$ to a product analyzing 74.4% metallic iron and 1.2% of combined iron at the rate of 9.4 pounds of ore for 1650 liters of reducing gas, the reducing gas analyzing CO—19.2%, H—37.0%, $H_2O$—1.0%, $CO_2$—0.6%, $CH_4$—0.4%, and N—41.8%.

It is to be observed that the process as carried out in the kiln described does not involve the introduction of solid fuel or reducing agent into or with the ore, but depends entirely upon the action of a reducing gas and the careful exclusion of oxidizing or combustion gases from the reducing zone of the kiln.

I claim:

1. A rotary kiln comprising a kiln tube surrounded by heat insulating material, a heating tube inside of and rotating with the kiln tube, a stationary head, a conduit extending through said stationary head into the space between said tubes, an ore discharge conduit extending from the space between the said tubes through said stationary head to a gas-tight receiver, a gas-tight seal between said stationary head and the rotary kiln structure surrounding the end of the kiln tube, a gas-tight seal between the stationary head and the end of the heating tube, means for introducing a heating gas through the stationary head into the heating tube and means for supplying ore to the space between said tubes.

2. A rotary kiln as defined in claim 1 in which the gas-tight seal between the rotary kiln structure and the stationary head surrounding the end of the kiln tube comprises a circular conduit carried by the stationary head and having a slot therein facing the rotary kiln structure, a ring secured to the rotary kiln structure and fitting into said slot and a conduit communicating with said circular conduit and adapted to deliver a plastic material thereinto.

3. A rotary kiln as defined in claim 1 in which the gas-tight seal between the rotary kiln structure and the stationary head surrounding the end of the kiln tube comprises a circular conduit carried by the stationary head and provided with a slot facing the rotary kiln structure, a ring secured to the rotary kiln structure and fitting into said slot, a conduit communicating with said circular conduit and adapted to deliver a plastic material thereinto, a cooling conduit contacting with the first named conduit, and means for circulating a cooling fluid through the last named conduit.

4. A rotary kiln as defined in claim 1 in which the gas-tight seal between the end of the heating tube and the stationary head comprises an opening through the stationary head into which the end of the heating tube extends, a graphite ring closely fitting said opening and abutting against the end of the heating tube, and means for pressing said ring against the end of said heating tube.

5. A rotary kiln as defined in claim 1 in which the stationary head is flexibly mounted to permit vertical movement thereof.

6. A rotary kiln as defined in claim 1 in which the heating tube extends entirely through the kiln tube.

7. A rotary kiln as defined in claim 1 in which the heating tube is provided with openings adjacent the feed end of the kiln.

8. A rotary kiln as defined in claim 1 in which the heating tube terminates adjacent the feed end of the kiln.

9. A rotary kiln as defined in claim 1 comprising means for delivering gases withdrawn from the space between the kiln tube and the heating tube at the feed end of the kiln to the heating tube adjacent the discharge end of the kiln.

SAMUEL BENSON THOMAS.